United States Patent [19]

Huber

[11] Patent Number: 5,283,686
[45] Date of Patent: Feb. 1, 1994

[54] OPTICAL SYSTEMS WITH GRATING REFLECTOR

[75] Inventor: David R. Huber, Warrington, Pa.

[73] Assignee: General Instrument Corporation, Jerrold Communications, Hatboro, Pa.

[21] Appl. No.: 919,823

[22] Filed: Jul. 27, 1992

[51] Int. Cl.$^5$ .............................................. H01S 3/02
[52] U.S. Cl. ................................... 359/337; 359/341
[58] Field of Search ............... 359/333, 341, 568, 572, 359/337; 385/10, 26, 96; 372/102

[56] References Cited

U.S. PATENT DOCUMENTS

| | | | |
|---|---|---|---|
| 3,731,223 | 5/1973 | Johnston, Jr. | 372/68 |
| 4,294,509 | 10/1981 | Nagao | 385/36 |
| 4,792,813 | 12/1988 | Rosen | 343/781 P |
| 4,839,527 | 6/1989 | Leitch | 250/573 |
| 4,864,310 | 9/1989 | Bernard et al. | 342/368 |
| 4,886,332 | 12/1989 | Wolfe | 385/11 |
| 4,953,939 | 9/1990 | Epworth | 359/705 |
| 4,986,623 | 1/1991 | Sorin | 359/569 |
| 5,007,705 | 4/1991 | Morey et al. | 385/12 |
| 5,138,483 | 8/1992 | Grasso et al. | 359/341 |

OTHER PUBLICATIONS

Belsley, K. L., et al., "Optically Multiplexed Interferometric Fiber Optic Sensor System," SPIE vol. 556, pp. 257-264, Fiber Optic and Laser Sensors III (1987).
Cheng, Y. H., et al., "Novel Configuration of an erbium-doped fiber amplifier using an optical circulator," presented at OFC'92.
Huber, David, R. "1.5 μm Narrow Bandwidth In-Fiber Gratings," published in *LEOS* (Nov. 4, 1991).
Huber, David, R. "Optical Phase and Amplitude Response of an In-Fiber Grating Resonator," presented at Topical Meeting in New Orleans, La., Apr. 13-16, 1992 and published in *OSA Integrated Photonics Research, Technical Digest Series*, vol. 10 (1992).
Meltz, G., et al., "Formation of Bragg gratings in optical fibers by a transverse holographic method," *Optics Letters*, vol. 14, No. 15 pp. 823-825 (Aug. 1, 1989).
Nagel, Jonathan, A., et al., "Multigigabit Capacity 1.5 μm WDM Field Trial," presented at OFC Tuesday, Feb. 19, 1992.
Willner, A. E., et al., FDMA-FSK1 Gb/s Star Network Using LD-Pumped Erbium Doped Fiber Preamplifiers with Optimal Noise Filtering, AT&T Bell Laboratories, Crawford Hill Laboratory.

*Primary Examiner*—Ian J. Lobo
*Attorney, Agent, or Firm*—Marshall, O'Toole, Gerstein, Murray & Borun

[57] ABSTRACT

Optical systems including an optical amplifier and a narrow bandwidth optical filter for removing undesired spontaneous emission. An in-fiber Bragg grating reflector reflects substantially only the input amplified signal back to a circulator port of an optical circulator where the desired amplified signal is coupled from the next circulator port. The undesired emission exits from the grating reflector and is removed from the system. Cascaded grating reflectors are used in a wavelength division multiplexing (WDM) system. A two section narrow band transmission filter with cascaded gratings.

5 Claims, 2 Drawing Sheets

OPTICAL SYSTEMS WITH GRATING REFLECTOR

TECHNICAL FIELD

The present invention relates generally to optical systems, and more particularly to such systems including an optical amplifier with a narrow bandwidth optical filter for removal of excess undesired spontaneous emission, such as noise.

BACKGROUND ART

Optical systems are presently being employed in the communication of voice and video information as well as in the high speed transmission of data. Optical communication systems are desired because of the wide bandwidths available for the information signal channels. However, the available wide bandwidths for the signal content also permits noise to be present over the same wide bandwidths so that both the desired signals and the undesired noise is amplified by the optical system amplifiers.

This problem presently exists in fiber optic systems, and a number of Erbium doped fiber optic amplifier systems have been proposed for use with narrow bandwidth optical filters to reduce detected spontaneous - spontaneous beat noise. It also is desired to remove excess spontaneous emission in optical amplifier systems that utilize cascaded Erbium doped amplifiers in order to prevent premature amplifier saturation which results from amplification of the desired optical signals along with the spontaneous emission. It is further desired to provide an Erbium fiber optic amplifier which can be readily integrated with an optical filter to remove the undesired emissions.

SUMMARY OF THE INVENTION

In accordance with the present invention, an optical amplifier and filter are provided in an optical system for removing undesired emission from an amplified optical signal so that the output of the optical system is an output signal having substantially only the desired amplified optical signal.

An optical amplifier is combined in an optical system with an optical circulator and a Bragg grating reflector. More particularly, in a preferred embodiment, an Erbium fiber optic amplifier with a narrow bandwidth optical filter is provided for removal of excess spontaneous emission from the optical system. The optical filter is formed of an in-fiber Bragg grating induced in the fiber by photo-refractive effects so that the grating reflects a very narrow band of wavelengths. The grating reflector thus is formed to reflect substantially only the desired signal.

The optical circulator includes at least three circulator ports for rotating optical signals from one port to the next port in a circulating direction. The grating reflector is connected to one of the circulator ports. The input optical signal is coupled to a first circulator port and is rotated to the next port containing the grating reflector so that the undesired emission exits and is lost, whereas the desired signal is reflected back to the second port and is then rotated to the third circulator port. Accordingly, the output from the third circulator port is the desired optical signal without the undesired emission.

A significant narrowing of the optical bandwidth was obtained with a constructed prototype of the present invention. As an example, with a single optical carrier input at 1545.5 nm, the output signal was down at least 20 dB at a bandwidth of about 0.2 nm around the carrier as compared to the output of the optical amplifier without the optical filter of the present invention. The optical filter which included the optical circulator and grating reflector had a 3 dB optical bandwidth of 21 GHz and an insertion loss of 8.26 dB, which insertion loss can be reduced to about 3.7 dB by replacing the prototype circulator with a production circulator.

In accordance with another aspect of the present invention, the optical circulator and grating reflector combination can be utilized as an optical multiplexer for multiplexing at least two optical signals each at a different wavelength. In accordance with the multiplexer aspect of the present invention, one of the optical input signals is coupled to a first of the circulator ports and the other of the input optical signals is coupled to a Bragg grating reflector which in turn is coupled to a second circulator port. The grating reflector is formed to reflect substantially only the first of the input signals so that as the first input signal is rotated from a first circulator port to the next circulator port containing the grating reflector, both the first input signal and the second input signal are rotated to the third circulator port. A multiplexed output of the two input signals can be obtained from the third circulator port.

In accordance with still another aspect of the present invention, the optical circulator and grating reflector can be utilized in an optical demultiplexer system for demultiplexing an input signal containing a group of signals each at a different wavelength into at least two optical signals. In accordance with the demultiplexer aspect of the present invention, the grating reflector is formed to reflect substantially only a desired optical signal at a particular wavelength. The input optical signal containing the desired signal as well as several other signals is coupled to the first circulator port and is then rotated to the circulator port containing the grating reflector so that only the desired signal is reflected from the grating reflector back to the second circulator port. Accordingly, the desired signal is then rotated to the third circulator port and may be obtained as an output from this third circulator port.

The present invention permits an Erbium doped fiber optic amplifier to be readily integrated with a narrow bandwidth optical filter for the removal of excess spontaneous emission. It is realized of course that the Bragg grating wavelength has a temperature dependency and that the wavelength stability of the grating can be controlled by placing the grating in a temperature controlled environment. The optical filter portion of the present invention based on in-fiber Bragg grating reflectors can be realized with an optical bandwidth that nearly matches the bandwidth required by the modulation format of the optical system.

The present invention can be expanded to accommodate systems which utilize wavelength division multiplexing (WDM) by adding additional Bragg reflectors. In one WDM embodiment three Bragg grating reflectors are cascade coupled to one optical circulator port. Each grating reflector is formed to reflect a respective very narrow band of grating wavelengths. Thus, an input containing several signals including at least three at the respective grating reflector wavelengths, will be demultiplexed so that the signal output from another of the circulator ports will contain only the three demultiplexed signals. In still another WDM embodiment two respective gratings in separate optical circulator ports are cascade coupled to provide an optical filter with a very narrow optical bandpass.

Accordingly, the present invention provides significant advantages in optical communication and sensor systems that require narrow optical bandwidth filters.

DESCRIPTION OF THE PREFERRED EMBODIMENTS

Figure 1:
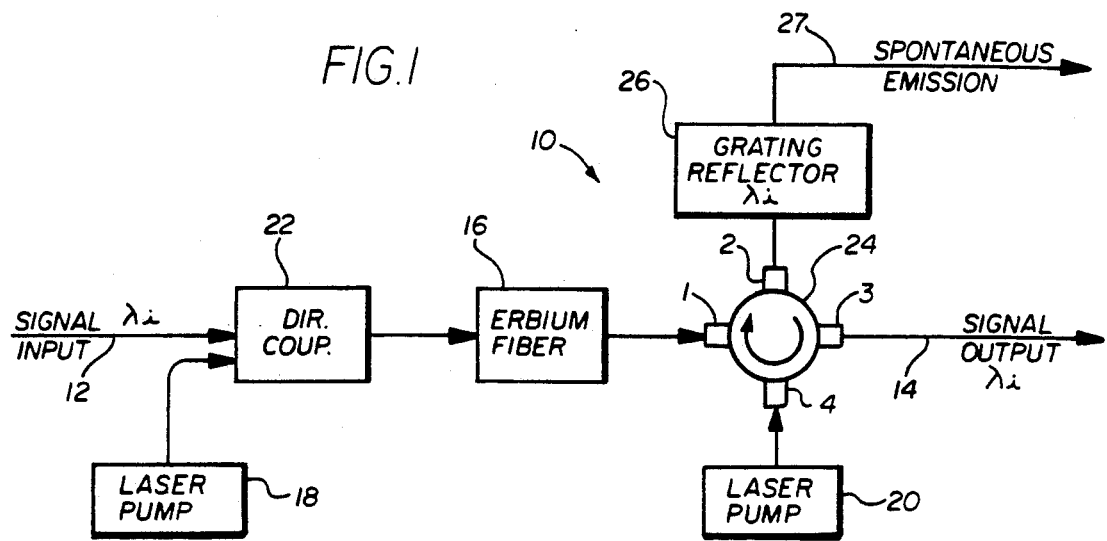
FIG. 1 is a schematic illustration of the preferred embodiment of an optical system which includes an optical amplifier and a narrow bandwidth optical filter in accordance with the principles of the present invention.

Referring now to FIG. 1, there is illustrated a fiber optic system 10 which includes an Erbium fiber optic amplifier portion integrated with a narrow bandwidth optical filter capable of receiving a signal input at an input line 12 and providing an amplified version of the signal input at an output line 14 from which excess spontaneous emission, such as noise, has been eliminated or substantially reduced. In particular, an Erbium fiber 16 is subjected to a laser pump 18 and 20 in accordance with standard optical pumping practice. Laser pump 18 and the signal input on input line 12 are coupled through an optic directional coupler 22 to one end of Erbium fiber 16. Laser pump 20 is coupled to the other end of Erbium fiber 16 through an optic circulator 24.

It is to be understood that instead of an Erbium fiber, other types of optic fibers may be utilized. As an example, other rare earth fibers known in the art can be used.

For convenience, the four ports of optic circulator 24 have been respectively labelled 1, 2, 3 and 4. Thus, the pumping wavelength is combined with the signal input on line 12 and is coupled to circulator port 1 and in turn is rotated to circulator port 2.

A Bragg grating reflector 26 is coupled to circulator port 2. Bragg grating reflector 26 may be formed by photo-refractive induced in-fiber gratings so that the grating reflects a very narrow band of wavelengths which in the present embodiment comprise the wavelengths corresponding to the input signal. As an example, in-fiber Bragg grating reflectors have been formed in a single-mode Erbium fiber by a photo-refractive induced Bragg reflector so that the resonant peak occurred at 1547.1 nm, with a 3 dB optical bandpass of 4 GHz wide.

Accordingly, Bragg grating reflector 26 reflects substantially only the signal input back to circulator port 2, whereas the unwanted spontaneous emission or noise is lost from the system as indicated on line 27. The desired signal reflected to circulator port 2 is then rotated to circulator port 3 and can be coupled from output line 14.

In a constructed prototype of the preferred embodiment of the invention shown in FIG. 1, the Bragg grating reflector 26 and optical circulator 24 provided a 3 dB optical bandwidth of 21 GHz and an insertion loss of 8.26 dB. The insertion loss can be significantly reduced further by replacing the prototype circulator used in the constructed prototype of the invention with a production circulator. In the case of a single optical carrier at 1545.5 nm, the measured 3 dB optical bandwidth was 21 GHz. In the constructed prototype, since a four port circulator was not available, a three port circulator configuration was utilized.

Figure 2:
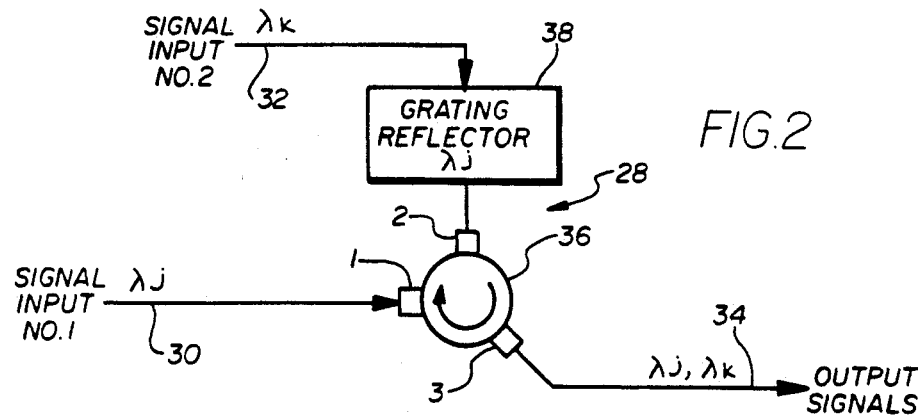
FIG. 2 is a schematic illustration of another embodiment of the invention showing an optical multiplexer system.

FIG. 2 illustrates a multiplexer 28 for receiving a first signal input on input line 30 and a second signal input on input line 32 and providing a combined output of the two input signals on output line 34. Multiplexer 28 includes a three port optical circulator 36. The first signal input on line 30 is connected to circulator port 1. The second signal input on input line 32 is connected to circulator port 2 through an in-fiber Bragg grating reflector 38. Grating reflector 38 is formed to reflect the wavelength of signals on input line 30. Thus, the first signal input on line 30 is rotated from circulator port 1 to circulator port 2 and is reflected from Bragg grating reflector 38 to circulator port 2, and is thereafter rotated to circulator port 3. The second signal input on input line 32 is coupled through Bragg grating reflector 38 to circulator port 2 and is thereafter rotated to circulator port 3. Accordingly, both of the multiplexed signals from input lines 30, 32 are presented on output line 34.

Figure 3:
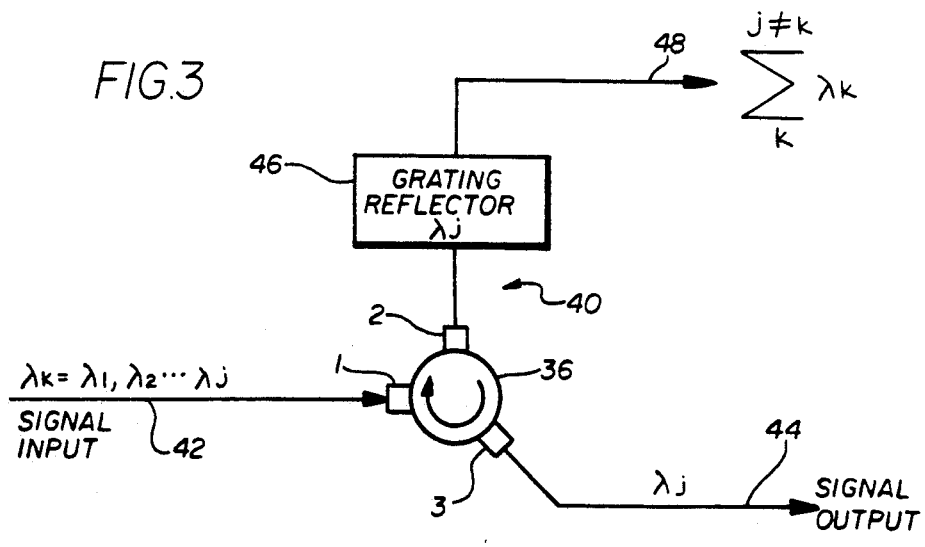
FIG. 3 is a schematic illustration of still another embodiment of the present invention showing an optical demultiplexer system.

FIG. 3 illustrates a demultiplexer 40 for receiving a composite group of signals on input line 42, where each of the input signals is of a different respective wavelength, and for providing the desired demultiplexed signal at the desired wavelength on output line 44. Demultiplexer 40 includes an in-fiber Bragg grating reflector 46 which is formed with an optical bandwidth that matches the desired signal to be demultiplexed from input line 42. Grating reflector 46 is coupled to circulator port 2 of the three port circulator 36. The composite of signals on line 42 are rotated from circulator port 1 to circulator port 2 and the desired signal to be multiplexed is reflected from grating reflector 46 and is thereafter rotated to circulator port 3 for coupling to output line 44. The remainder of the composite group of signals from input line 42, except for the desired multiplexed signal coupled to output line 44 are lost as they exit from the other end of grating reflector 46 which is coupled to line 48.

Figure 4:
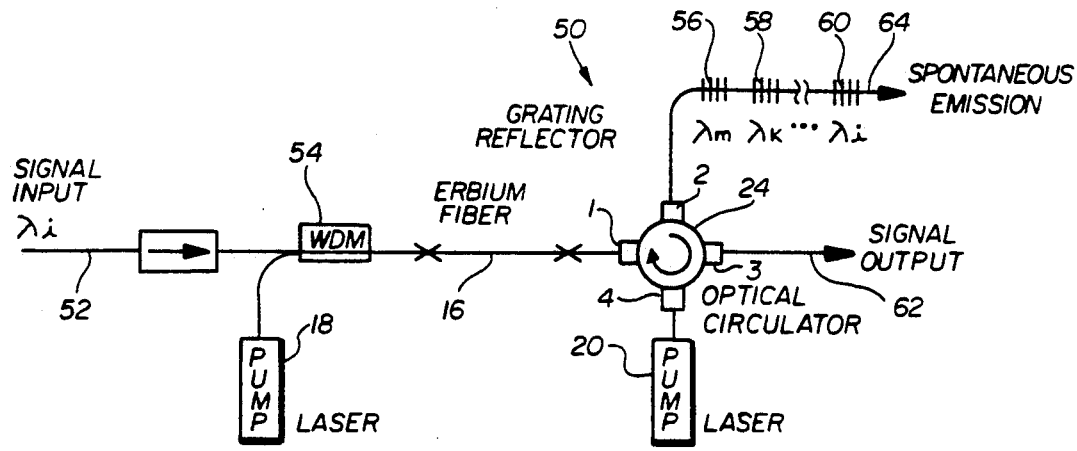
FIG. 4 is a schematic illustration of still another embodiment of the invention employed in a wavelength division multiplexing (WDM) system.

It is to be understood that rather than the directional coupler 22 as shown in FIG. 1, a wavelength division multiplexing (WDM) device ca be utilized. Reference may now be made to FIG. 4, wherein there is illustrated an optical system 50 which includes an optical amplifier for wavelength division multiplexing (WDM) with spontaneous emission or noise suppression. The input signal on input line 52 includes a composite of signals each at a different wavelength.

The input signal is coupled to a WDM device 54 which is able to pass all of the required wavelengths with a minimum of insertion loss. Respective Bragg grating reflectors 56, 58, 60 are coupled to circulator port 2 of the optical circulator 24. Each of the grating reflectors 56, 58, 60 is formed so as to reflect substantially only an associated narrow band of wavelengths each corresponding to a respective signal which is present in the input signal on input line 52.

Accordingly, signals conforming to the grating reflectors 56, 58, 60 are reflected back to circulator port 2 and eventually are rotated to circulator port 3 for coupling to output line 62. However, spontaneous emission passes through the grating reflectors and is lost on exit line 64.

Figure 5:
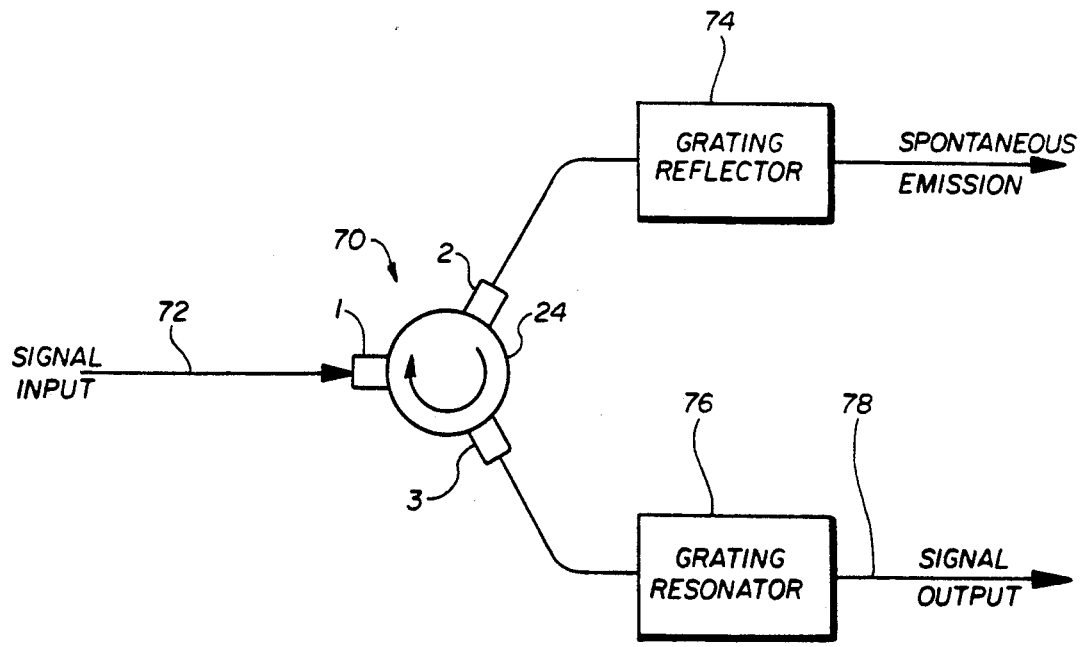
FIG. 5 is a schematic illustration of still another embodiment of the present invention showing an optical system including a narrow band optical transmission filter.

FIG. 5 illustrates the cascading of a reflection filter and a transmission filter wherein both are formed of in-fiber Bragg gratings. A narrow band optical transmission filter 70 includes an optical circulator 24 for receiving an input signal on input line 72 which is coupled to circulator port 1. A Bragg grating reflector 74 is coupled to circulator port 2. A grating resonator 76 forming a transmission filter is coupled to circulator port 3.

Grating reflector 74 is formed with a 3 dB optical bandwidth of 70 pm. Grating resonator 76 is formed with a 3 dB optical bandpass of 4 GHz. Both of the bandpasses of gratings 74 and 76 are centered on the same wavelength. Thus, the input signal on line 72 rotated to circulator port 2 and reflected by grating reflector 74 back to port 2 is rotated to port 3 and passes through grating 76 to signal output line 78. The combined transmission characteristic of the cascaded two section filter 70 in a constructed prototype had a 10 dB bandwidth of about 0.5 nm.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention, and the exclusive use of all modifications which come within the scope of the appended claims is reserved.

I claim:

1. An optical amplifier and filter for providing an amplified optical signal having a desired signal and undesired emission and for removing said undesired emission from said amplified optical signal to provide an optical output signal having substantially only said desired signal, said optical amplifier and filter comprising:

an optical amplifier for receiving an optical signal input and providing said amplified optical signal;

an optical circulator having at least three circulator ports for circulating optical signals from one port to the next port in a circulating direction;

means for coupling said amplified optical signal having said desired signal and said undesired emission to a first of said circulator ports;

a grating reflector for reflecting substantially only said desired signal while not reflecting said undesired emission from said grating reflector to separate the desired signal from the undesired emission;

means for coupling said grating reflector to a second of said circulator ports which is the next circulator port in the circulating direction from said first circulator port for reflecting said desired signal back to said second circulator port; and said optical output signal having substantially only said desired signal coupled from a third of said circulator ports which is the next port in the circulating direction from said second circulator port, so that said desired signal is separated from the undesired emission.

2. An optical amplifier and filter according to claim 1, wherein said desired signal includes a plurality of signals each having a respective wavelength, and including, a respective grating reflector for each of said plurality of signals for reflecting substantially only said corresponding signal, and said means for coupling said grating reflector to said second circulator port includes means for cascade coupling said respective grating reflectors to said second circulator port.

3. An optical amplifier and filter according to claim 1, wherein said optical amplifier is a fiber optic amplifier and said grating reflector is formed of in-fiber Bragg gratings.

4. An optical amplifier and filter according to claim 3, wherein said optical amplifier includes an Erbium doped optic fiber.

5. An optical amplifier and filter according to claim 1, including a grating resonator for transmitting substantially only said desired signal, and means for coupling said grating resonator to said third of said circulator ports so that said grating reflector and said grating resonator are cascade coupled to remove said undesired emission from said amplified output signal.

* * * * *